United States Patent Office 3,461,116
Patented Aug. 12, 1969

3,461,116
MERCAPTO-PHENOXYMETHYL-PENICILLINS
Helmut Nahm, Kelkheim, Taunus, Adolf Oppermann, Hofheim, Taunus, Hinrich Hoffmann, Kelkheim, Taunus, Max Kornlein, Frankfurt am Main, and Heinz Oppinger, Hofheim, Taunus, Germany, assignors to Farbwerke Hoechst Aktiengesellschaft vormals Meister Lucius & Bruning, Frankfurt am Main, Germany, a corporation of Germany
No Drawing. Filed July 10, 1964, Ser. No. 381,914
Claims priority, application Germany, July 13, 1963,
F 40,226
Int. Cl. C07d 99/22; A61k 21/00
U.S. Cl. 260—239.1                    7 Claims

ABSTRACT OF THE DISCLOSURE

Mercapto-phenoxymethyl-penicillins of the formula

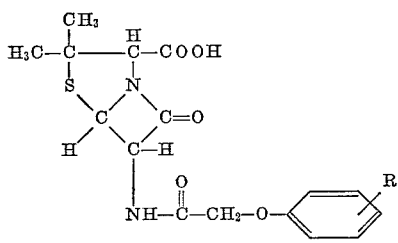

in which R is alkyl mercapto, alkenyl mercapto, phenylalkenyl mercapto, piperidyl mercapto, pyridyl mercapto, phenyl mercapto, substituted phenyl mercapto, naphthyl mercapto, substituted naphthyl mercapto, diphenyl mercapto, and phenyl alkyl mercapto.

---

Ever since the observation has been made that the addition of phenylacetic acid as a so-called precursor to culture solutions containing *Penicillium chrysogenum* strongly promotes production of a particular penicillin, namely penicillin G, several attempts have been made to produce penicillins that have other than the known properties by using the most varied precursors.

Thus, Behrens et al. tested a number of precursors [J. Biol. Chem. 175, 751, 765, 771, 793 (1948); J. Am. Chem. Soc. 70, 2837, 2843, 2849 (1948)]; the salts of several new penicillins (for example, phenoxymethyl-penicillin, phenylmercapto - methyl - penicillin, thienyl - penicillin, and others) are subject matters of U.S. Patents 2,479,295, 2,479,296, 2,479,297, 2,562,410, 2,562,408, 2,623,876 and 2,562,411, and of British Patent 643,514.

Besides the observations made by Behrens et al., Brandl and Margreiter (Österr Chemiker Zeitung, vol. 55, [1954] 11) have found that phenoxy-methyl-penicillin (designated by the authors as penicillin V) can be crystallized as free acid and exhibits good acid stability. Therefore, the compound is very suitable for oral application (cf. Wiener Med. Wochenschrift 33/34, 602 and Austrian Patents 178,692 and 181,689).

Another penicillin which is acid-stable to a large extent, the p-cresoxymethyl-penicillin, can be prepared by the addition of p-cresoxyacetic acid (U.S. Patent 2,756,226).

A 4-flourophenyl-mercapto-methyl-penicillin which is especially active against gram-nebative micro-organisms is obtained according to British Patent 916,488, using 4-fluoro-phenyl-mercapto-acetic acid as the precursor.

Now, we have found that new penicillins having the formula

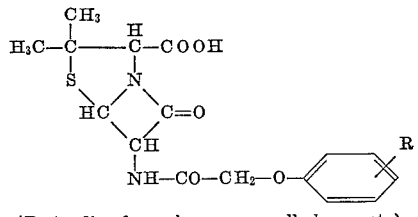

(R standing for arylmercapo or alkylmercapto)

are obtained by using as the precursor the hitherto unknown alkyl- or aryl-mercapto-phenoxyacetic acids or their salts, the corresponding aldehydes or alcoholates or the functional derivatives of these compounds. The alkyl groups in tht above formula may preferably be straight or branched chain radicals having 1 to 8 C-atoms, for example, methyl, ethyl, n-propyl, t.-butyl and n-octyl; these radicals may also carry substituents, for example, amino, hydroxy and phenyl groups. As examples, there may be mentioned α-amino-n-butyl, β-hydroxy-ω-amino-n-hexyl, and benzyl.

In addition to the above-mentioned substituents, the alkyl groups may also contain double linkages such, for example, as vinyl, allyl, and cinnamyl.

Furthermore, the alkyl groups may also be a part of a carbocycle or heterocycle; representatives of such groups are, for example, cyclopropyl, cyclopentyl, cyclohexyl, methyl-cyclopentyl, 2,3-piperidyl, 4-piperidyl, pyridyl, and tetrahydro-pyranyl.

The aryl radicals may preferably be phenyl and naphthyl radicals which may carry up to two substituents; the substituents may preferably be methyl, ethyl, phenyl, chlorine, bromine, nitro, amino, and hydroxy. As examples, there may be mentioned 2-toluyl, 4-ethyl-phenyl, 2 - chloro-phenyl, 2.4 - dichloro-phenyl, 3 - bromophenyl, 2 - aminophenyl, 3-aminophenyl, 4-aminophenyl, 4 - hydroxy-phenyl, 4 - nitrophenyl, 2 - nitro-6 - methyl-phenyl, 2-hydroxy-3-aminonaphthyl, and p-biphenylyl.

Furthermore, we have found that the new precursors exhibit only a weak toxicity towards the mold, so that they can be added either at the beginning of the fermentation or portionwise or in continuous manner during the fermentation. The rate of addition may be regulated in such a manner that the pH of the culture solution is kept in the range from 5.5 to 8.0, preferably 6.4 to 6.8, during fermentation. After interruption of the fermentation, the penicillin formed is isolated from the filtered culture solution in known manner, i.e. by extraction. The extraction is carried out by means of butyl acetate after acidification of the culture filtrate to a pH of 2 to 3; from the extract, the penicillin is transferred to a buffer solution, preferably a phosphate buffer, at pH 7.0, and, after acidification, extracted from the latter by means of butyl acetate.

Final precipitation is carried out with the aid of alkali metal compounds, alkaline earth metal compounds or ammonium compounds or with the aid of organic bases or their salts, which are added in the form of a solution or suspension. By compounds are to be understood preferably the salts, hydroxides and alcoholates. The salts of organic acids have proved particularly suitable, especially the salts of aliphatic or cycloaliphatic carboxylic acids such as acetic acid or ethylhexanecarboxylic acids, and among these, in the first instance the sodium and potassium salts. Even organic bases or their salts may be used, since the penicillin salts formed possess in many cases the advantage of being difficultly soluble. By organic bases are to be understood bases which have a sufficient content of basic nitrogen, for example, procaine, dibenzylamine, N,N'-dibenzyl-ethylene-diamine, dehydro - abietylamine, N,N'-bis-dehydroabietyl-ethylene-diamine, tetracycline and other amines which may be used for salt formation with penicillin G and V. In addition, the salts of the penicillins obtained according to the present invention can also be prepared by converting the salt recovered upon precipitation, by a double reaction with one of the above-mentioned compounds, into the desired final product.

The precipitation can be carried out either totally or by fractions. Separation of unconsumed precursor can be effected in a manner simpler than the separation of phenoxacetic acid in the preparation of penicillin V. If required, the product can be recrystallized from a mixture of acetone and water.

The compounds of the invention can also be obtained in the form of free acids either by acidification of aqueous solutions of the salts or by concentration from organic solvents.

The penicillins of the present invention exhibit a very good stability to acids. Their microbial activity spectrum is quite different from that of the hitherto known penicillins. The penicillins of the present invention are particularly active against streptococci and staphylococci and show almost no activity against gram-negative bacteria. Thus, if applied orally, they do not affect the intestinal flora. The new penicillins may be administered in the form of the free acids or of the salts of these acids.

The following examples illustrate the invention but they are not intended to limit it thereto:

Example 1

80 ml. of a sterile nutrient solution having the composition:

|  | G. |
|---|---|
| Cane sugar | 20 |
| Calcium carbonate | 10 |
| Corn steep liquor | 75 | made up with water to a volume of 1000 ml., were introduced into a 300 cc. Erlenmayer flask, inoculated with *Penicillium chrysogenum* spores and shaken for 48 hours at 25° C. 3 ml. of this culture, designated as the prestage culture, were transferred to 50 ml. of sterile main-stage solution (composition: 55 g. of lactose, 50 g. of corn steep liquor, 7 g. of primary potassium phosphate, 10 g. of calcium carbonate, 3 g. of magnesium sulfate, made up with water to a volume of 1000 ml.) and this solution was shaken at 25° C. After 24 hours, 125 mg. of potassium salt of 4-methylmercapto-phenoxyacetic acid as the precursor were added. After further shaking for 96 hours, the solution was found to contain 1080 units of acid-stable penicillin per ml. of solution.

Example 2

A sterile pre-stage solution (composition: 2.0 g. of cane sugar, 7.0 g. of corn steep liquor, 1.0 g. of fatty oils, 1.0 g. of calcium carbonate, in 100 ml. of $H_2O$) was inoculated with *Penicillium chrysogenum* spores and shaken for 26 hours at 25° C. A pre-fermenter solution (sterile nutrient solution: 7.4 kg. of cane sugar, 28 kg. of corn steep liquor, 3.7 kg. of calcium carbonate, 3.7 l. of fatty oils, 370 l. of water) was inoculated with the aforesaid culture solution and fermentation was allowed to proceed for 36 hours at 25° C., while vigorously stirring and aerating. The solution was then transferred to the main-stage fermenter solution (sterile nutrient solution: 170 kg. of lactose, 180 kg. of corn steep liquor, 12.75 kg. of calcium carbonate, 17.7 kg. of primary potassium phosphate, 4.94 kg. of magnesium sulfate, 6.25 l. of fatty oils, made up with water to a volume of 2500 l.); this solution was allowed to ferment at 25° C., while stirring virogously and aerating. After the 24th, 36th, 48th, 60th, 72nd, 84th, 96th, 120th and 132nd hour, each time 500 g. of potassium salt of 4-methylmercapto-phenoxyacetic acid, dissolved in 8 l. of water, were added as the precursor. After a fermentation period of 160 hours, the solution was found to contain 2750 units of acid stable penicillin per ml.

2200 l. of fermented culture solution were freed from mycelium by filtration. The 4-methylmercapto-phenoxymethyl-penicillin was extracted from the filtrate at a pH of 2 by means of 500 l. of butyl acetate, transferred from the organic phase to 48 l. or a potassium-sodium phosphate buffer solution having a pH of 9, and the latter was extracted at a ph of 2 with 25 ml. of butyl acetate. From the butyl acetate phase, there were isolated by adding a total of 6100 ml. of a 20% solution of anhydrous potassium acetate in methanol, after drying with 3.4 kg. of anhydrous sodium sulfate, 3112 million units of 4-methylmercapto-phenoxymethyl-penicillin in the form of the potassium salt.

Appearance.—Colorless, short, often fan-like coalesced needles, melting at about 243–245° C. with foaming up.

Elementary analysis. — $C_{17}H_{19}O_5N_2S_2K$ (molecular weight: 434.59). Calculated: C, 46.98; H, 4.40; N, 6.45; S, 14.76; Found: C, 46.45; H, 4.75; N, 6.9; S, 14.55.

Infrared spectrum: characteristic narrow, strong band at 1765K (cm.$^{-1}$), attributed to the β-lactam ring, measured in solid KBr. Stronger bands, which are not present in the infrared spectrum of the potassium salts of penicillin G and V and which differentiate the new penicillin from these, are at 1883, 1509, 1275, 1006, 967, 954, and 840K (cm.$^{-1}$).

Ultraviolet spectrum.—Flat band at 245–260 mμ (maximum at about 253 mμ), measured in water (20 mcg./ml.).

Test for activity.—As a unit, there is considered that amount of new penicillin which is chemically equivalent to 0.6 mcg. of penicillin-G-Na.

Iodometric test, 1270 units/mg.; hydrogen test, 1371 units/mg.; biological assay vs. *Staphylococcus aureus* ATCC 6538 P, 1369 units/mg.; acid stability (1 hour at pH 2 in HCl-glycocoll buffer), 1310 units/mg.

Solubility.—Easily soluble in water, moderately soluble in methanol, sparingly soluble in higher alcohols, ether, acetone, ethyl acetate and butyl acetate, benzene, alkanes and chlorinated hydrocarbons.

Example 3

Following the procedure described in Example 1, using 125 mg. of 4-methylmercapto-phenoxy-ethanol as the precursor, there were obtained 249 units of acid stable penicillin/ml.

Example 4

By proceeding as described in Example 1, using 125 mg. of 4-allylmercapto-phenoxyacetic acid as the precursor, there were obtained 370 units of acid stable penicillin/ml.

Example 5

By proceeding as described in Example 1, using 125 mg. of 4-hexylmercapto-phenoxyacetic acid as the precusor, there were obtained 143 units of acid stable penicillin/ml.

Example 6

By proceeding as described in Example 1, using 125 mg. of 4-(3'-phenyl)-allylmercapto-phenoxyacetic acid as the precusor, there were obtained 140 units of acid stable penicillin/ml.

Example 7

By proceeding as described in Example 1, using 50 mg. of 4-methylmercapto-phenoxyacetic acid ethyl ester as the precursor, there were obtained 640 units of acid stable penicillin/ml.

Example 8

By proceeding as described in Example 1, using 125 mg. of potassium salt of the 3-methylmercapto-phenoxyacetic acid as the procursor, there were obtained 176 units of acid stable penicillin/ml.

Example 9

By proceeding as described in Example 1, using 50 mg. of 3-methylmercapto-phenoxyacetic acid chloride as the precursor, there were obtained 194 units of acid stable penicillin/ml.

Example 10

In a comparative test carried out as described in Example 1, without adding a precursor to the culture solution, no acid stable penicillin was formed.

Example 11

4.35 g. of potassium salt of the 4-methylmercapto-phenoxymethyl-penicillin were dissolved in 20 ml. of water and combined with a solution of 1.80 g. of N,N'-dibenzylethylenediamine-diacetate in 50 ml. of water. The N,N'-dibenzyl-ethylenediamine salt separated in the form of a snow-white precipitate, was stirred for a short time, filtered off with suction and washed with 50 ml. of water. It was then dried under reduced pressure at room temperature over $CaCl_2$; 5.30 g. of a white salt were obtained which was found to melt at about 118° C.

Biological assay, 1015 units/mg. The infrared spectrum exhibited likewise the strong band at 1765K (cm.$^{-1}$), attributed to the $\beta$-lactam ring.

Example 12

4.35 g. of potassium salt of 4-methylmercapto-phenoxymethyl-penicillin were dissolved in 20 ml. of water and combined, while stirring, with a solution of 2.46 g. of 3,3-diphenyl-propene-(2)-amino-hydrochloride in 90 ml. of water. The white crystal magma formed was combined with 50 ml. of water, filtered with suction and the precipitate was washed with 100 ml. of water. The 3,3-diphenylpropene-(2)-ammonium salt of 4-methylmercapto-phenoxymethyl-penicillin was obtained in the form of clusters of colorless needles. After drying under reduced pressure at room temperature over $CaCl_2$, the yield was 6.67 g.; the substance was found to melt with decomposition at about 130° C.

Biological assay, 960 units/mg. The infrared spectrum exhibited the typical $\beta$-lactam band at 1765K (cm.$^{-1}$).

Example 13

Equimolar quantities of potassium salt of 4-methyl-mercapto-phenoxymethyl-penicillin and 4-methyl-amino-aceto-pyrocatechin hydrochloride in aqueous solution were combined in the manner described in Examples 11 and 12. The 4-methylammonium-aceto-pyrocatechin salt of 4-methylmercapto-phenoxymethyl-penicillin was obtained in the form of a snow-white, finely crystalline substance which was found to begin to sinter at about 135° C. with slow decomposition.

Biological assay, 908 units/mg. The infrared spectrum distinctly exhibited the $\beta$-lactam band at 1765K (cm.$^{-1}$).

Example 14

5.0 g. of potassium salt of 4-methylmercapto-phenoxymethyl-penicillin were dissolved in 80 ml. of water; to this solution, 2 N-hydrochloric acid was added dropwise, until a pH-value of 2.5 was attained. Thereupon, the free acid of the penicillin separated in the form of fine oil droplets which, after short trituration, passed into a white crystalline precipitate. After suction-filtration washing with 200 ml. of water and drying, there were obtained 4.3 g. of 4-methylmercapto-phenoxymethyl penicillin showing a biological activity of 1414 units/mg The infrared spectrum exhibited the $\beta$-lactam band which was slightly shifted to 1690K (cm.$^{-1}$), and the $C=O$ band of the free carboxyl group at 1640K (cm.$^{-1}$)

The compounds used as the precursors in the process of the present invention can be prepared, for example, by reacting alkyl- or aryl-mercapto-phenols with halogeno acetic acids or their functional derivatives, for example the esters or salts, or with halogeno-acetaldehydes, preferably in acetalized form, or with $\beta$-halogenoethanols in the presence of bases.

We claim:

1. Mercapto-phenoxymethyl-penicillin of the formula in which R represents a member selected from the group consisting of alkylmercapto having up to 6 carbon atoms alkenylmercapto and phenyl-substituted alkenylmercapto each having up to 3 carbon atoms in the alkenyl group piperidylmercapto; pyridylmercapto; phenylmercapto phenylmercapto substituted by up to two substituent selected from the group consisting of lower alkyl, chlorine, bromine, nitro, amino, and hydroxy; naphthyl mercapto; naphthylmercapto substituted by up to two substituents selected from the group consisting of lower alkyl, chlorine, bromine, nitro, amino, and hydroxy; di phenylmercapto; and phenyl-lower alkyl mercapto.

2. Physiologically tolerated salts of the compound claimed in claim 1.

3. 4-methylmercapto-phenoxymethyl-penicillin.

4. The potassium salt of 4-methylmercapto-phenoxy methyl penicillin.

5. 4-allylmercapto-phenoxymethyl penicillin.

6. 4-hexylmercapto-phenoxymethyl penicillin.

7. 4-(3'-phenyl)-allylmercapto-phenoxymethyl penicillin.

References Cited

UNITED STATES PATENTS

| | | | |
|---|---|---|---|
| 3,301,849 | 1/1967 | Gottstein et al. | 260—239. |
| 2,479,296 | 8/1949 | Behrens et al. | 260—239. |
| 2,562,408 | 7/1951 | Behrens et al. | 260—239. |
| 2,756,226 | 7/1956 | Brandl et al. | 260—239. |
| 2,951,839 | 9/1960 | Doyle et al. | |
| 3,079,306 | 2/1963 | Offe et al. | 260—239. |
| 3,174,964 | 3/1965 | Hobbs et al. | 260—239. |

FOREIGN PATENTS

| | | |
|---|---|---|
| 880,400 | 10/1961 | Great Britain. |
| 889,066 | 2/1962 | Great Britain. |

NICHOLAS S. RIZZO, Primary Examiner

U.S. Cl. X.R.

260—999